Dec. 30, 1969  E. F. BRUNS  3,486,676
SLIDE FEED
Filed March 25, 1968  2 Sheets-Sheet 1
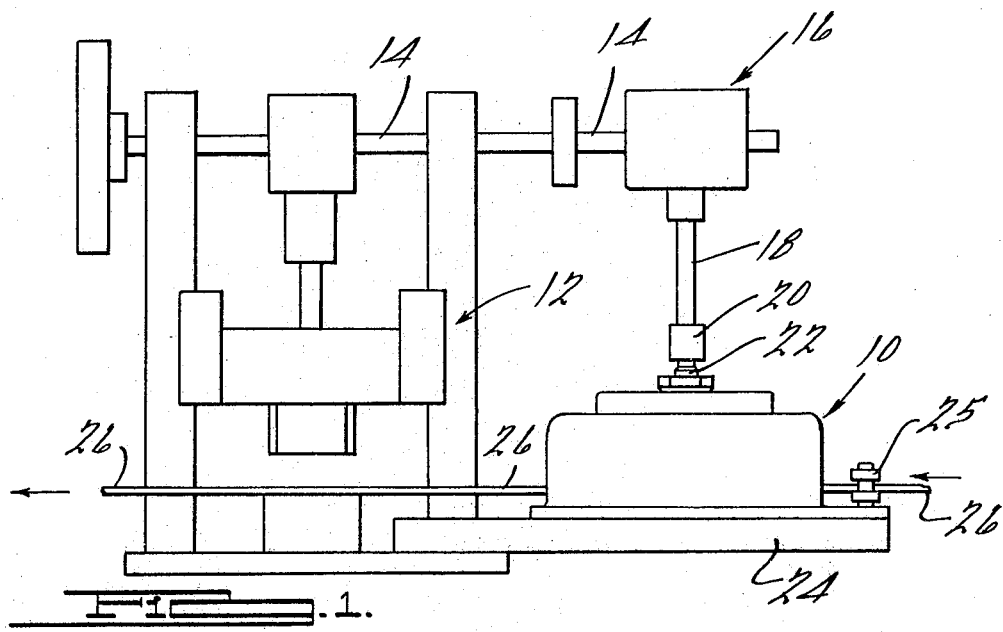
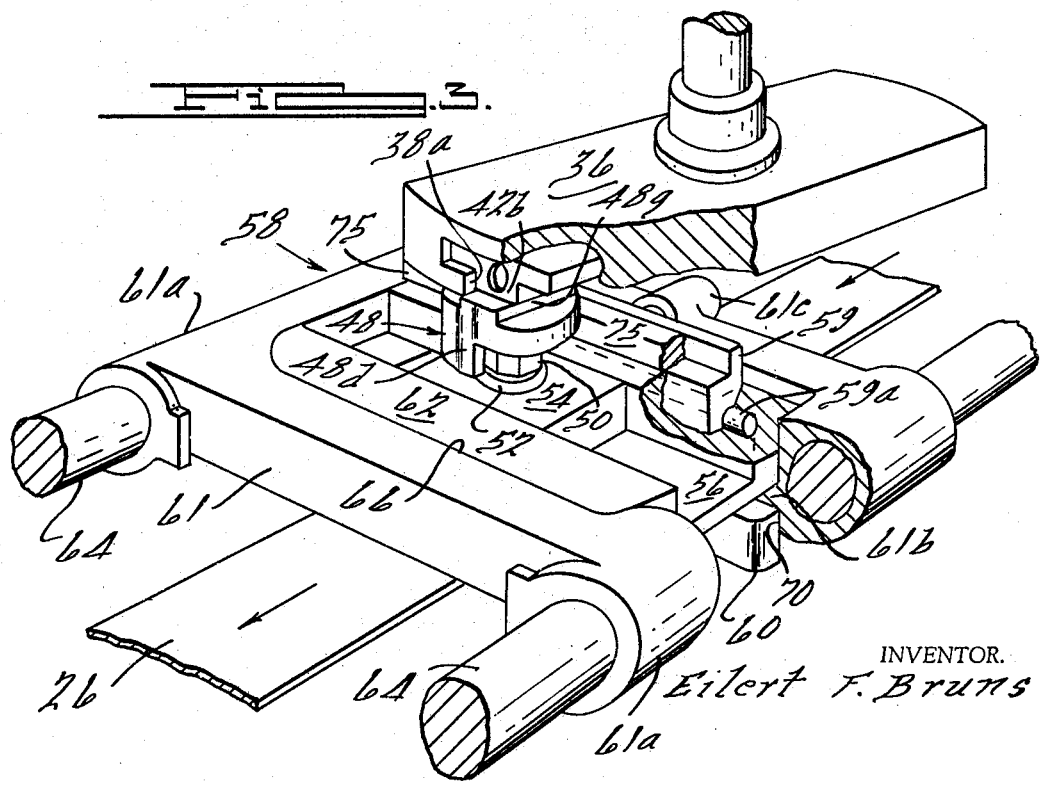
INVENTOR.
Eilert F. Bruns Dec. 30, 1969     E. F. BRUNS     3,486,676
SLIDE FEED
Filed March 25, 1968     2 Sheets-Sheet 2
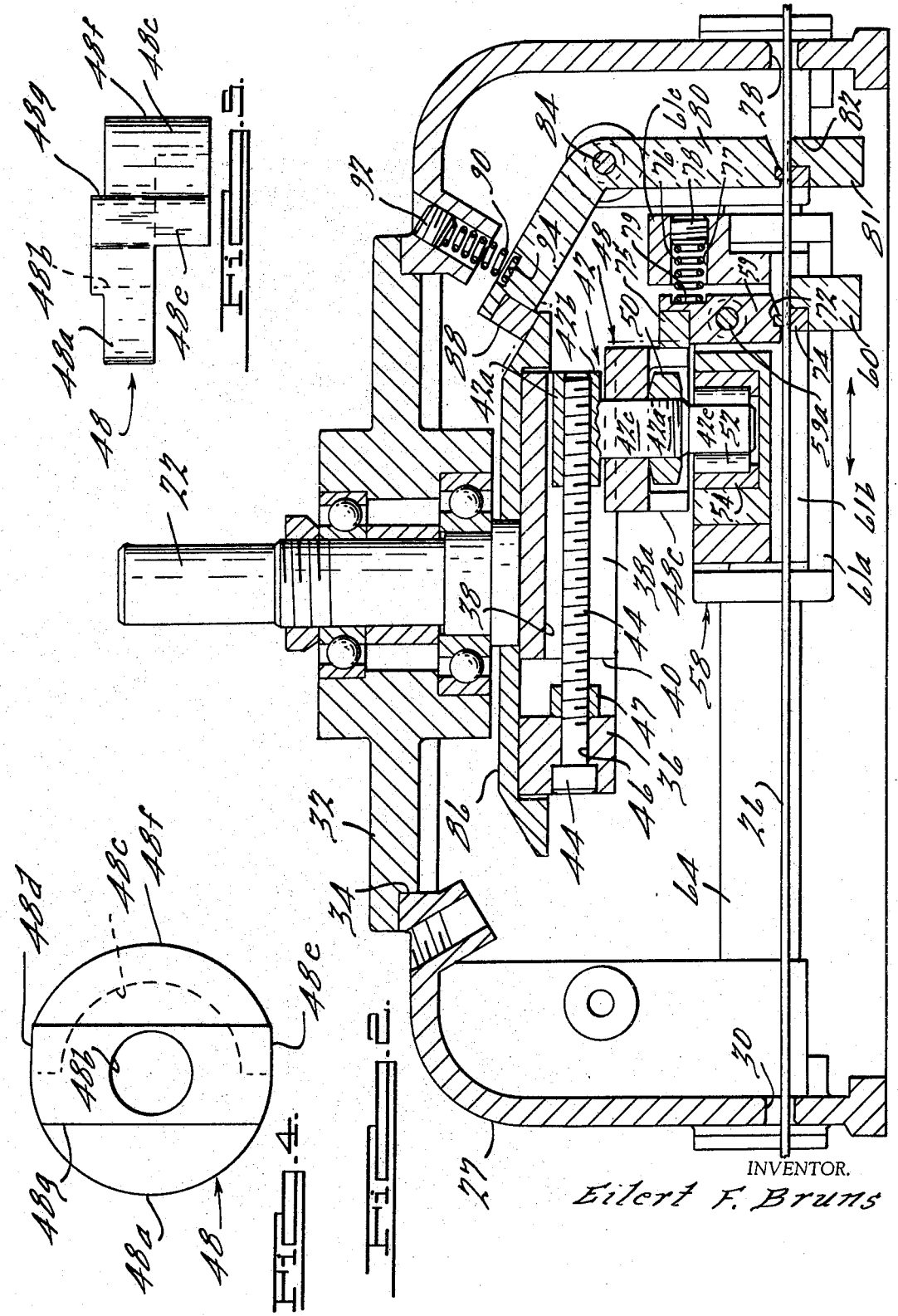
INVENTOR.
Eilert F. Bruns

United States Patent Office 3,486,676
Patented Dec. 30, 1969

3,486,676
SLIDE FEED
Eilert F. Bruns, 6572 Heather Heath Lane,
Birmingham, Mich. 48010
Filed Mar. 25, 1968, Ser. No. 715,682
Int. Cl. B65h *17/36*
U.S. Cl. 226—149                                                10 Claims

ABSTRACT OF THE DISCLOSURE

A slide feed attachment for incrementally feeding strip metal to a metal-working apparatus wherein the clamping jaws for alternately gripping and releasing the metal strip to incrementally advance it to the metal-working apparatus are actuated by a feed cam on the crank pin of the crank mechanism for reciprocating the jaw carrier.

BACKGROUND OF INVENTION

This invention relates to feeding devices. More particularly, it relates to feeder attachments, commonly called slide feeds, which are attached to and driven by metal-working apparatus and operate to feed strip metal to the apparatus in predetermined increments corresponding to the length of strip metal required for each operation of the metal-working apparatus.

Various forms of slide feeds are presently available commercially. While these available forms are generally satisfactory, they tend to be rather expensive both in initial cost and maintenance. Less expensive forms are available; however, these less expensive forms are generally incapable of providing the necessary accuracy and operational speed required for use in conjunction with modern, precision, high speed metal-working apparatus.

SUMMARY OF INVENTION

The primary object of the present invention is to provide an improved slide feed.

A more specific object is to provide a slide feed with fewer reciprocating parts, and a smaller reciprocating mass, than known feeds of this type.

A related object is to provide a slide feed which is less expensive in both initial expense and upkeep than known units of comparable capacity.

Yet another object is to provide a slide feed which is capable of higher operating speeds than presently available slide feeds.

Still another object is to provide a slide feed in which a single unit is capable of functioning as either a right-hand feed or a left-hand feed.

The slide feed of the invention is of the type wherein a reciprocating jaw carrier is driven from the metal-working apparatus by a crank mechanism comprising a shaft driven from the metal-working apparatus, a crank on the shaft, and a crank pin on the crank operatively connected to the jaw carriage. According to an important feature of the invention, the jaws on the jaw carrier are selectively moved between their clamping and released positions by a feed cam fixed on the crank pin and coacting with a cam surface on one of the jaws so that portions of the feed cam of selectively varying eccentricity with respect to the axis of the crank pin are selectively presented to the cam face on the jaw as the feed cam moves through a rotary cycle with the crank pin.

According to another feature of the invention, the carrier defines a slideway extending transverse to the path of reciprocatory movement of the carrier and the free end of the crank pin is journalled in a slide block slidably received in the transverse slideway on the carrier; thus, as the shaft and crank are rotated, the carrier reciprocates along the feed path of the metal strip while the slide block journalling the crank pin reciprocates transversely of the carrier.

According to a specific feature of the invention, the crank pin is in the form of a T-bolt with the cross head of the bolt slidably received in a radial slideway on the crank, the free end of the shank of the bolt journalled in the slide block, and the portion of the bolt between the free end and the cross head providing a shank portion for receipt of the feed cam for actuating the jaws.

BRIEF DESCRIPTION OF THE DRAWINGS

A preferred embodiment of the invention is illustrated in the accompanying drawings. In the drawings:

FIGURE 1 is a view of a slide feed according to the invention shown attached to a metal-working apparatus;

FIGURE 2 is a cross-sectional view of the slide feed of the invention;

FIGURE 3 is a fragmentary perspective view of the slide feed of the invention; and FIGURES 4 and 5 are top and elevational views, respectively, of a feed cam employed in the slide feed of the invention.

DETAILED DESCRIPTION OF THE PREFERRED EMBODIMENT

The slide feed of the invention is illustrated generally at 10 in FIGURE 1 and is seen attached to a metal-working apparatus indicated generally at 12. Metal-working apparatus 12 may be any of various types.

Slide feed 10 is driven from apparatus 12 by a shaft 14 providing the input shaft of a bevel gear box 16; the output shaft 18 of gear box 16 is coupled by a collar 20 to the input shaft 22 of the slide feed 10 so that the slide feed is driven in synchronism with the operation of the apparatus 12. Slide feed 10 is supported in a position adjacent apparatus 12 as by a plate 24 secured in cantilever fashion to the bed of apparatus 12. A pair of guide rollers 25 journalled on plate 24 serve to guide metal strip 26 to slide feed 10.

With particular reference now to FIGURES 2 and 3, slide feed 10 includes a cast housing 27 which is adapted to be positioned on plate 24 and which houses the internal workings of the slide feed. Slit like openings 28 and 30 at either end of the housing allow the metal strip 26 to pass through the housing along the feed path for apparatus 12. A bearing plate 32 closes a large central opening 34 in the upper wall of housing 26 and provides a bearing support for slide feed input shaft 22. Input shaft 22 is formed integral with a block member 36 forming a cross head with respect to shaft 22, shaft 22 and block member 36 together constituting a throw block. A T-shaped channel 38 extends longitudinally of block member 36. Channel 38 opens at its lower end in the lower face of block member 36 and at its right end (as viewed in FIG. 2) in the right end of the block member. The other end of channel 38 terminates in a slot 40 extending vertically through the block member. A T-bolt 42 is slidably positioned in channel 38. The cross head 42a of bolt 42 threadably receives an adjusting bolt 44 journalled at its head end in a bore 46 in alignment with channel 38. It will be apparent that the stem of T-bolt 42 constitutes the crank pin of a crank mechanism and that the throw of this crank mechanism may be selectively adjusted by selective rotation of bolt 44 to move T-bolt 42 along channel 36. A lock nut 47 accessible through slot 40 locks bolt 44 in any desired position of adjustment.

Cross head 42a includes a lower guide portion 42b which slidably guides in the stem portion 38a of channel 38.

The stem of T-bolt 42 includes a smooth shank portion 42c directly below cross head 42a, a threaded portion 42d below shank section 42c and a smooth reduced diameter shank portion 42e at the free end of the stem.

A feed cam 48 is positioned on shank portion 42c of the T-bolt. Cam 48 is seen in detail in FIGURES 4 and 5. Cam 48 includes a main body portion 48a having a central bore 48b receiving T-bolt portion 42c and a skirt portion 48c depending from main body portion 48a and extending through an arc of approximately 180 degrees with respect to the central axis of the cam member. Skirt portion 48c provides the working face of the cam and includes flats 48d, 48e at opposite ends of the skirt connected by a dwell portion 48f. In assembled relation as seen in FIGURES 2 and 3, an upper ridge or key portion 48g of the cam fits slidably within the lower end of stem portion 38a of channel 38 to preclude rotation of the cam relative to block member 36 and T-bolt 42 while yet allowing the cam to move slidably along the block member 36 with T-bolt 42. A lock nut 50 is threaded onto portion 42d of the T-bolt within skirt portion 48c to preclude downward displacement of cam 48, it being necessary to back nut 50 off slightly in order to effect the previously described sliding adjustment of T-bolt 42 along channel 38. Shank portion 42e of T-bolt 42 is journalled in a needle bearing 52 carried by a slide block 54. Slide block 54 is mounted for sliding movement along a slideway 56 defined by a jaw carriage seen generally at 58.

Carriage 58 is adapted to move coacting feed jaws 59 and 60 reciprocally along the feed path of the metal strip. Carriage 58 includes a main body member 61 and an insert member 62. Main body carriage member 61 includes a pair of cylindrical portions 61a which slidably engage a pair of parallel cylindrical rails 64 rigidly fixed to housing 26 and extending parallel to and straddling the metal strip feed path. The central portion of member 61 is voided to provide an opening 66 within which insert member 62 is supported with the bottom of the insert member resting on a pair of ribs 61b provided by main body carriage member 61 along opposite side edges of opening 66. Insert member 62 is transversely grooved to provide the slideway 56 within which slide block 54 slidably guides. The forward or right-hand (as viewed in FIGS. 2 and 3) portion of insert 62 is in the form of a yoke within which upper jaw 59 is positioned with trunnions 59a on each end of jaw 59 journalling in suitable bores in the adjacent portions of insert 62 to mount jaw 59 for selective pivotal movement toward and away from a position of clamping relationship with lower jaw 60. Lower jaw 60 is fixed on the carriage with its opposite ends received in downwardly opening slots 70 provided in ridge portions 61b of main body carriage member 61. Carbide inserts 72 and 74 are provided at the working faces of upper and lower jaws 59, 60, respectively. The upper end of upper jaw 59 is notched to receive a cam bar 75 for camming coaction with feed cam 48. Cam bar 75 extends laterally beyond jaw 59 on each side of the latter to approximately the full width of slideway 54. A coil spring 76 is received in a threaded bore 77 formed in a spring housing portion 61c of carriage member 61. Spring 76 bears at one end against a threaded plug 78 and is received at the other end is a socket 79 formed in the rear face of the upper end of jaw 59; spring 76 thus acts to continuously urge jaw 59 toward a position of clamping coaction with jaw 60.

A pair of upper and lower braking jaws 80, 81 are also provided for selective coaction with feed jaws 59, 60. Lower jaw 81 is fixedly secured to housing 26 with its opposite ends receiving in downwardly opening slots 82 in the housing. Upper jaw 80 has a dog leg configuration and is journalled at 84 in the housing for pivotal movement toward and away from a position of clamping engagement with the fixed lower jaw. This pivotal movement is effected by a cam disk 86 fixed to shaft 22 and cammingly coacting with a cam bar 88 positioned within a notch provided at the upper end of upper jaw 80. A coil spring 90 is positioned within a threaded oblique bore in housing 26; spring 90 bears at one end against a threaded plug 92 and is received at the other end in a socket 94 to the rear face of the upper end of jaw 80 so that it acts to continuously urge jaw 80 toward a position of clamping coaction with jaw 81.

In operation, slide feed 10 is driven in synchronism with metal-working apparatus 12 and acts to incrementally feed metal strip 32 to the metal-working apparatus in timed relation to the operation of that apparatus. Specifically, rotation of shaft 22 rotates cross head or crank 36 which in turn moves T-bolt 42 through an orbit determined by the position of adjustment of the T-bolt along channel 38. As T-bolt 42 rotates, bolt portion 42e acts as a crank pin and move slide block 54 back and forth within slideway 56 while moving carriage 58 back and forth along a reciprocable path corresponding in length to the diameter of the orbit traced by T-bolt 42. During this reciprocable movement of the carriage, feed cam 48 coacts with cam bar 75 to open and close feed jaws 59, 60 in timed relationship to the reciprocable movement of the carriage.

Specifically, as the carriage reaches the end of its backward stroke as seen in FIG. 2, cam bar 75 moves off of dwell portion 48f of cam skirt 48c and onto flat portion 48d, thereby allowing spring 78 to pivotably move upper jaw 59 counterclockwise as viewed in FIG. 2 into a position of clamping coaction with lower jaw 60, whereby to firmly grip metal strip 32 therebetween. Thus, as the carriage moves into its forward stroke, metal strip 32 moves forwardly with the carriage under the grip of jaws 59, 60. During the movement of the carriage through its forward stroke, skirt 48c is turned away from cam bar 75 so that the came does not interefere with the action of spring 78 in maintaining the jaws in clamping relationship. As the carriage approaches the end of the forward stroke, skirt 48c moves around toward bar 75 until, as the carriage reaches the end of its forward stroke as seen in FIG. 2, flat 48e moves into engagement with the cam bar; as the carriage begins its rearward stroke, bar 75 moves onto dwell portion 48f of the cam so that jaw 59 is pivoted clockwise as seen in FIG. 2 against the bias of spring 78 to raised position in which the strip 32 is released from clamping engagement by the jaws. Thus, as the carriage moves through its back stroke, dwell portion 48f acts to maintain the jaws in a released condition so that the carriage moves backwardly along the released strip to position itself for a new incremental feed stroke. As the carriage reaches the rearward position of FIG. 3, cam bar 75 again moves onto flat 48d to allow spring 78 to again urge jaws 59 into clamping relationship with the strip preparatory to the commencement of a new incremental feed stroke.

In order to ensure that the strip will not be displaced during the back stroke of the carriage along the strip, cam disk 86 is designed to present a concentric face 86a to brake jaw 80 at such time as the strip is released by jaws 59, 60 at the commencement of the carriage back stroke; concentric face 86a allows spring 90 to pivot jaw 80 counterclockwise into clamping engagement with the strip to preclude displacement of the strip. Conversely, as the carriage reaches the end of its back stroke, cam disk 86 presents an eccentric face 86b to cam bar 88 so that jaw 88 is pivoted clockwise against the bias of spring 90 to a raised position in which the strip 32 is released for forward movement with the carrier.

The disclosed slide feed will be seen to provide a simple, positive, and effective device for incrementally feeding metal strip to a metal working apparatus. Since the reciprocating and rotating parts are relatively few in number and small in mass, the slide feed of the invention is capable of extremely high speed operation with the speed of operation of the slide feed being limited, as a practical matter, only by the speed of the host metal working apparatus. The relatively small number and mass of the moving parts also contributes importantly to the durability and low maintenance of the invention slide feed. Further, the invention slide feed, by virtue of its symmetrical construction, may be readily converted from a left-hand feeding operation to a right-hand feeding operation, and conversely. Specifically, although the invention slide feed has been illustrated and described as effecting a right to left feeding movement (as seen in the drawings) it may be readily converted to a left to right feeding operation by simply rotating the feed cam 48 and the brake cam 86 through an angle of 180° while maintaining the shafts on which they are carried stationary.

Similarly, if the direction of rotation of input shaft 22 is reversed, the direction of strip feed through the slide feed may be maintained as before the reversal of shaft rotation by simply rotating the cam and brake discs through 180 degrees. The invention slide feed thus reduces inventory and stocking requirements by allowing a single slide feed unit to be used in a number of different metal feed applications requiring different input shaft rotational directions and/or different feed orientations with respect to the host metal working apparatus.

While a preferred embodiment of the invention has been illustrated and described in detail, it is to be understood that various changes may be made in the disclosed embodiment.

I claim:

1. A slide feed for incrementally feeding strip metal to a metal-working apparatus, comprising
   (A) a shaft adapted to be driven continuously in synchronism with the operation of said metal-working apparatus;
   (B) means defining a crank on said shaft;
   (C) a crank pin on said crank;
   (D) a carriage mounted for reciprocable movement along a feed path generally normal to said shaft axis;
   (E) means interconnecting said crank pin and said carriage and operative in response to rotation of said shaft to reciprocate said carriage along said path;
   (F) a pair of clamping jaws carried by said carrier for reciprocable movement therewith along said path; and
   (G) jaw control means, including a feed cam surface fixed with respect to said crank and eccentrically positioned with respect to the axis of said crank pin, operative in response to rotation of said shaft to alternately move said jaws into and out of clamping relationship, whereby said jaws may clamp the strip metal during the forward stroke of said carrier to feed an increment of the strip metal to said apparatus and thereafter release said strip metal to allow the carrier to move backwardly along the strip metal to position itself for the next incremental feed stroke.

2. A slide feed according to claim 1 wherein
   (H) said carriage defines a slideway generally transverse to said feed path and said shaft axis; and
   (I) said interconnecting means includes a slide block mounted for sliding movement along said slideway and journalling the free end of said crank pin.

3. A slide feed according to claim 1 wherein
   (H) said jaws comprise upper and lower jaws;
   (I) said upper jaw is mounted on said carriage for pivotal movement between clamping and released positions;
   (J) said feed cam surface is defined by a feed cam fixed on said crank pin; and
   (K) said jaw control means further includes
      (1) a cam surface on said upper jaw for coaction with said feed cam and
      (2) a spring bearing against said upper jaw in opposition to the camming action of said feed cam.

4. A slide feed according to claim 3 wherein said spring is arranged to bias said upper jaw in a clamping direction and said feed cam operates to move said upper jaw out of clamping relationship against the bias of said spring.

5. A slide feed according to claim 3 wherein said cam surface is defined by a feed cam bar rigidly secured to said upper jaw and extending normally to said feed path to provide sliding engagement with said feed cam during the arcuate travel of the latter along the orbit of said crank pin.

6. A slide feed according to claim 1 and further including
   (H) brake means operative to
      (1) firmly grip said metal strip during the backward stroke of said carrier to preclude displacement of said strip during such backward stroke, and
      (2) release said strip during the forward stroke of said carrier to allow said carrier to incrementally feed said strip to said metal-working apparatus.

7. A slide feed according to claim 6 wherein said brake means comprises
   (I) a lower, fixed clamping jaw;
   (J) an upper clamping jaw mounted for pivotal movement between
      (1) a clamping position in which it coacts with said lower jaw to grip the metal strip therebetween, and
      (2) a released position in which the metal strip is free to slide between the jaws; and
   (K) a cam fixed on said shaft in eccentric relation to the shaft axis and coacting with a cam surface on said upper jaw to move said upper jaw between its clamping and released position in response to rotation of said shaft.

8. A slide feed according to claim 2 wherein
   (H) said shaft and crank are constituted by a throw block having a slideway extending radially in the crank portion thereof;
   (I) said crank pin is constituted by a T-bolt having
      (1) a cross head slidably received in said throw block slideway,
      (2) a first shank portion immediately below said cross head,
      (3) a threaded portion below said first crank portion, and
      (4) a second shank portion below said threaded portion; and
   (J) said feed cam surface is defined by a feed cam fitted over said first shank portion and held in position by a nut threaded onto said threaded portion with said second shank portion extending downwardly to define the free end of said crank pin journalled in said slide block.

9. A slide feed according to claim 8 wherein the working face of said feed cam is defined by an arcuate skirt portion depending downwardly from the main body portion of said cam and said nut is positioned on said threaded bolt portion within said skirt portion of the feed cam.

10. A slide feed for incrementally feeding strip metal to a metal-working apparatus, comprising
   (A) a shaft adapted to be driven continuously in synchronism with the operation of said metal-working apparatus;
   (B) means defining a crank on said shaft;
   (C) a crank pin on said crank;
   (D) a carriage mounted for reciprocable movement along a feed path generally normal to said shaft axis and defining a slideway generally transverse to said feed path and said shaft axis;
   (E) a pair of clamping jaws carried by said carriage for reciprocable movement therewith along said feed path;

(F) a slide block mounted for sliding movement along said slideway and journalling the free end of said crank pin whereby said carriage will reciprocate along said path and said slide block will reciprocate on said carriage along said slideway in response to rotation of said shaft; and (G) means operative in response to rotation of said shaft to alternately move said jaws into and out of clamping relationship.

References Cited

UNITED STATES PATENTS 2,696,380  12/1954  Adams _____ 226—165

M. HENSON WOOD, Jr., Primary Examiner

U.S. Cl. X.R.

226—165